United States Patent [19]

Formentos

[11] Patent Number: 4,585,175

[45] Date of Patent: Apr. 29, 1986

[54] FLUID FLOW CONTROL IN FLOW LINE BRANCH

[75] Inventor: Paul J. Formentos, Folsom, Pa.

[73] Assignee: Speakman Company, Wilmington, Del.

[21] Appl. No.: 624,353

[22] Filed: Jun. 25, 1984

[51] Int. Cl.⁴ ........................ E03B 9/20; F16K 1/02

[52] U.S. Cl. ........................ 239/553; 239/29; 137/872

[58] Field of Search ........................ 239/16, 17, 28, 29, 239/29.3, 29.5, 31, 543, 544, 553, 553.3, 553.5, 505, 518, 513; 137/872, 876

[56] References Cited

U.S. PATENT DOCUMENTS

| | | | |
|---|---|---|---|
| 524,113 | 8/1894 | Kroll | 137/876 |
| 555,573 | 3/1896 | Haas . | |
| 1,116,298 | 11/1914 | Lacing | 239/31 |
| 1,128,001 | 2/1915 | Kaminsky | 239/31 |
| 1,187,373 | 6/1916 | Nomiya . | |
| 1,314,066 | 8/1919 | Jackson | 239/29 |
| 1,527,222 | 2/1925 | Rasmussen . | |
| 1,639,162 | 8/1927 | Brooks | 239/505 X |
| 1,780,168 | 11/1930 | Burmeister . | |
| 2,196,511 | 4/1940 | Wagner et al. | 137/876 X |
| 2,270,595 | 1/1942 | Lewis . | |
| 2,635,006 | 4/1953 | Richmond | 239/11 |
| 2,720,889 | 10/1955 | Gothberg | 137/872 X |
| 2,994,483 | 8/1961 | Christian | 239/16 X |
| 3,251,556 | 5/1966 | Burnham | 239/543 X |
| 3,297,293 | 1/1967 | Andrews et al. | 248/499 |
| 3,413,660 | 12/1968 | Lagarelli et al. | 239/29 X |
| 3,599,251 | 8/1971 | Wright | 239/16 X |
| 3,602,436 | 8/1971 | Wright | 239/553.3 |
| 3,794,249 | 2/1974 | Lockwood | 239/539 |
| 4,190,082 | 2/1980 | Crispo | 137/872 X |

*Primary Examiner*—Joseph F. Peters, Jr.
*Assistant Examiner*—Kevin P. Weldon
*Attorney, Agent, or Firm*—Connolly and Hutz

[57] ABSTRACT

An adjustable volumetric control and balancing element is positioned in a flow passageway at the juncture of a supply line and two discharge ports. The element has a beveled end face in the flow passageway for directing fluid from the supply line to the discharge ports. Adjustment of the position of the beveled end face within the flow passageway controls and balances the flow of fluid directed to the discharge ports.

11 Claims, 10 Drawing Figures

Fig. 7.
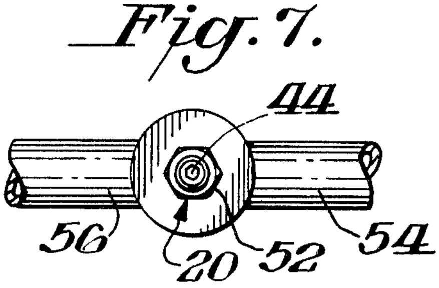
Fig. 4.
Fig. 5.
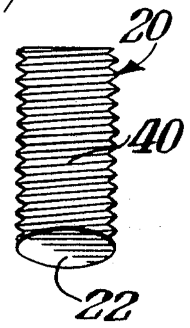
Fig. 6.
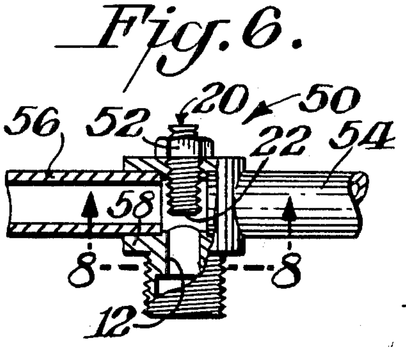
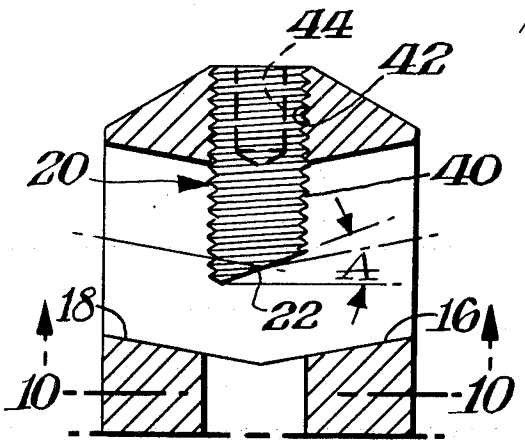
Fig. 3.
Fig. 8.
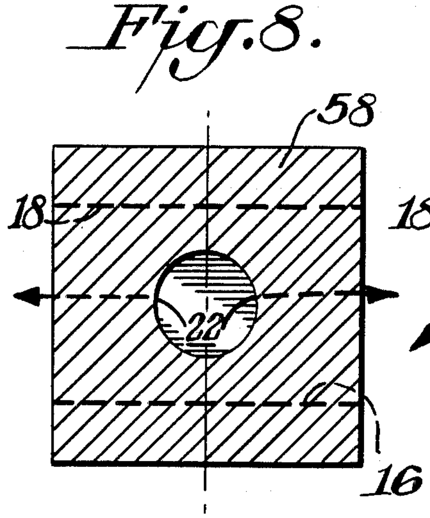
Fig. 9.
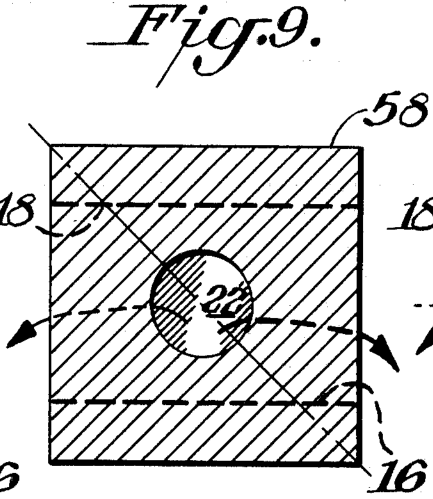
Fig. 10.
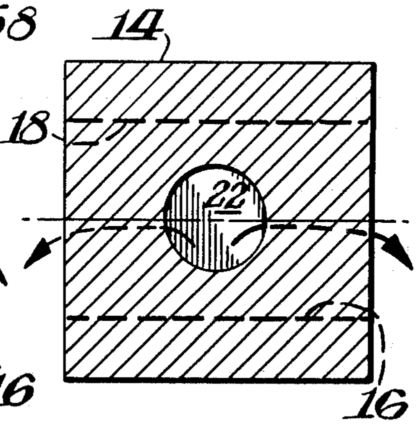

FLUID FLOW CONTROL IN FLOW LINE BRANCH

BACKGROUND OF THE INVENTION

The present invention relates to a fluid flow device, and more particularly to a volumetric control and balancing element that adjustably alters the flow through the device.

Many fluid flow devices require a controlled and balanced flow therethrough in order to accomplish a desired end result. For example, in emergency devices of the type for flushing the face or eyes with water, two streams are generally directed toward one another so that they converge at a central point. It is important that the rate of flow and the velocity of each stream be the same in order to produce such convergence for proper bathing of the eyes and face with water. Absent regulation of the flow, one stream may have a greater velocity and flow rate when compared to the other. This causes an imbalance between the streams which produces inadequate washing of both sides of the face and/or both eyes.

While wash devices of this type are designed and manufactured to produce equal streams, adjustment is almost always required due to manufacturing tolerances and inherent internal differences between the branch lines from which the streams emerge. Hence, adjustment is necessary in order to control and balance the flow through the device.

BRIEF DESCRIPTION OF THE INVENTION

Accordingly, it is an object of the present invention to provide an arrangement for controlling and balancing fluid flow which is simple in construction and easy to use.

In accordance with the present invention, a fluid flow device has an internal flow passageway including a single supply line connected to two discharge ports. An adjustable volumetric control and balancing element is positioned in the flow passageway at the juncture of the supply line and the two discharge ports. The element includes a beveled end face in the flow passageway for directing fluid from the supply line to the discharge ports. Structure is provided for changing the position of the beveled end face within the flow passageway to thereby control and balance the flow of fluid directed to the discharge ports.

Preferably, the beveled end face is planar and geometrically positioned at an angle of approximately 20° from a perpendicular to the flow through the supply line. Moreover, the structure connected to change the position of the beveled end face within the flow passageway may include cooperating machine threads on the volumetric control and balancing element and the fluid flow device. An operator is arranged to rotate the element relative to the device to thereby change the position of the beveled end face.

The volumetric control and balancing element may have a generally cylindrical body with the machine threads on the outside thereof. A wrench socket is provided in the outside end of the element for cooperation with an operator in the form of a wrench arranged to matingly engage the socket. Simple rotation of the element relative to the device produces the desired adjustment of the beveled end face until the flow is properly balanced. Moreover, a locking nut may be threaded onto the volumetric control and balancing element to lock the element in place relative to the device.

In one embodiment of the invention, branch lines are connected to the discharge ports, and the flow passageway comprising the supply and branch lines is T-shaped. In another embodiment, the flow passageway is Y-shaped. Preferably each of the branch lines has a substantially similar cross-sectional flow area.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 3 is an enlarged front elevational view of the volumetric control and balancing element shown in FIGS. 1 and 2, with the surrounding structure shown in section;

FIG. 4 is a top plan view of the volumetric control and balancing element shown in FIG. 3;

FIG. 5 is a right side elevational view of the volumetric control and balancing element shown in FIG. 3;

FIG. 6 is a partial front elevational view of another volumetric control and balancing element, according to the present invention, with some portions broken away to show interior details;

FIG. 7 is a top plan view of the embodiment shown in FIG. 6;

FIG. 8 is a sectional view taken along line 8—8 of FIG. 6;

FIG. 9 is a sectional view similar to FIG. 8 illustrating another position of the volumetric control and balancing element; and FIG. 10 is a sectional view taken along line 10—10 of FIG. 3 illustrating still another position of the volumetric control and balancing element.

DETAILED DESCRIPTION OF THE INVENTION

Figure 2:
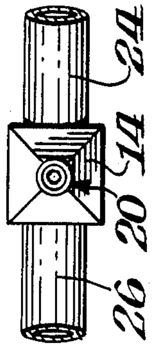
FIG. 2 is a partial top plan view of the construction shown in FIG. 1.
Figure 1:
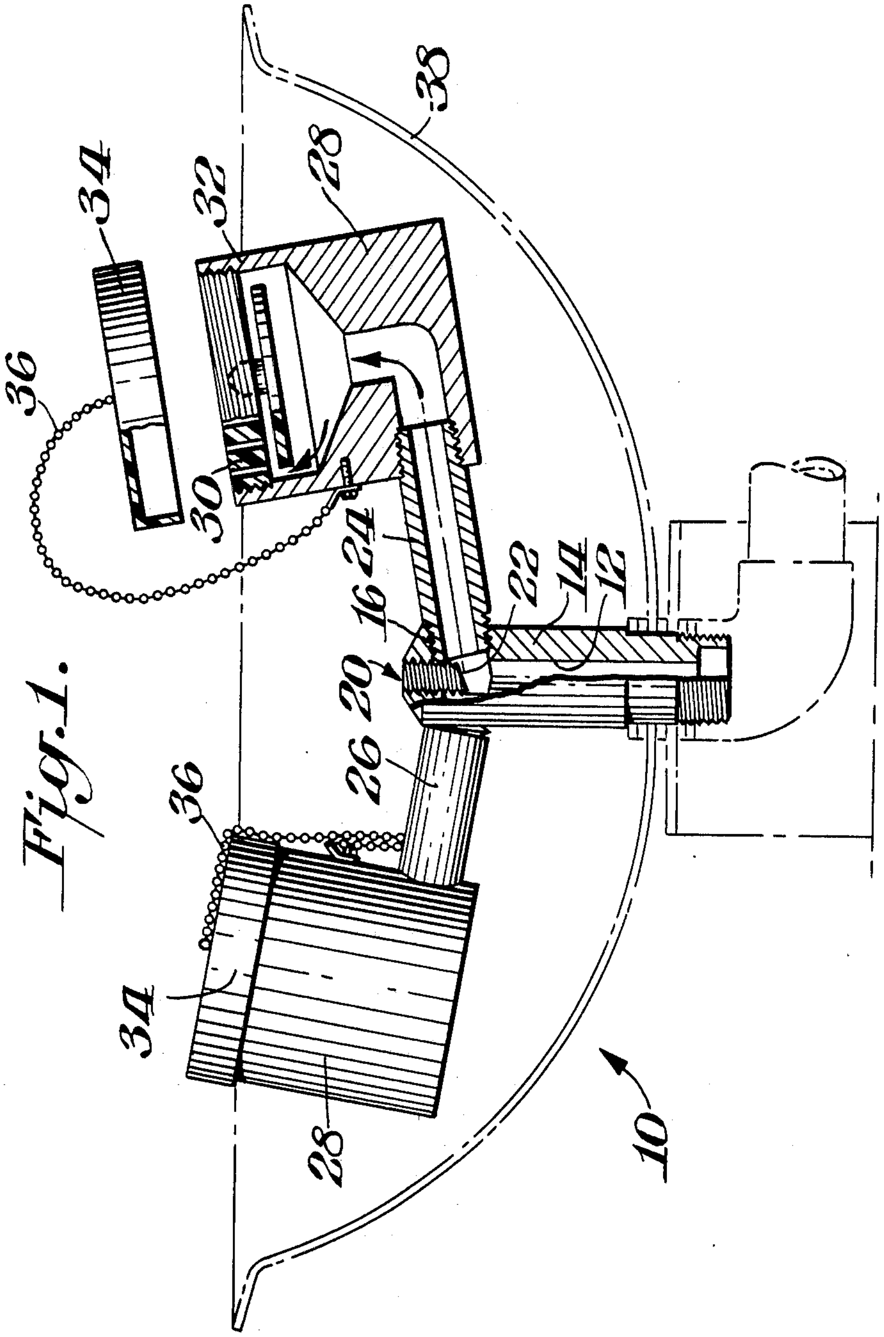
FIG. 1 is a partial front elevational view of an eye-face wash construction utilizing a volumetric control and balancing element, according to the present invention, with some portions broken away to show interior details and other portions shown in phantom outline.

Referring in more particularity to the drawing, FIGS. 1-5 illustrate a fluid flow device 10 designed for use as an eye-face wash. The device is primarily employed in emergency situations to bathe the facial area and thereby flush away contaminants and other foreign matter. As is well known, water flows through the device and emerges therefrom in two converging streams to perform the cleansing operation.

The eye-face wash fluid flow device 10 includes a single supply line 12 provided by any suitable conduit 14. Supply line 12 is connected to two discharge ports 16,18 disposed opposite each other and through which fluid emerges from the supply line.

An adjustable volumetric control and balancing element 20 is positioned in the fluid flow passageway of device 10 at the juncture of the supply line 12 and the two discharge ports 16,18. Element 20 includes a beveled end face 22 in the flow passageway for directing fluid from supply line 12 to the discharge ports 16,18. As explained more fully below, orientation of the beveled end face 22 within the fluid flow passageway is used to control and balance the flow of fluid directed from supply line 12 to the discharge ports 16,18.

The remainder of the eye-face wash device 10 includes a branch line 24 connected to discharge port 16 and a similar branch line 26 connected to discharge port 18. These connections may be threaded and each branch is slightly angled in an upward direction. As such, the flow passageway comprising single supply line 12 and branch lines 24,26 is generally Y-shaped. Each of the branch lines has a substantially similar cross-sectional flow area. Each branch line is connected at its opposite end to a spray head assembly 28 having a spray nozzle face plate 30. A baffle plate 32 inside each assembly 28 just before the face plate functions to mix and direct water through the individual nozzles in the face plate. A dust cover 34 and chain assembly 36 are used to protect face plate 30 when the fluid flow device 10 is not being used. Bowl 38 catches the spent liquid which is drained away.

Details of the volumetric control and balancing element 20 are best shown in FIGS. 3–5. Element 20 has a generally cylindrical body portion with machine threads 40 on the outside surface thereof. These threads cooperate with internal threads 42 in the body of the flow device 10 in the manner shown in FIG. 3. A wrench socket 44 designed to accommodate an Allen wrench is provided in the outside end of element 20 opposite the bevel 22. Insertion of the Allen wrench into the socket 44 and rotation of the element 20 shifts the beveled face 22 relative to the fluid flow passageway to thereby alter the flow directed to the discharge ports. Element 20 is so manipulated until the volume is proper and the flow through each port is the same whereby the flow is volumetricaly balanced.

Preferably, the beveled end face 22 is planar and disposed at an angle of about 20° to the horizontal. Such angle is illustrated in FIG. 3 as angle A, and is measured from a perpendicular to the flow through supply line 12. When angle A is less than 20°, the control is finer and more rotation of element 20 is needed to achieve volumetric balance. Conversely, when angle A is greater than 20°, the adjustment is more abrupt and less rotation of element 20 is required.

FIGS. 6 and 7 partially illustrate another fluid flow device 50 wherein the volumetric control and balancing element 20 is secured in place by a locking nut 52 threaded onto the exterior of the element and bearing against the structure forming the device 50. Also, branch lines 54,56 are connected to the discharge ports 16,18 in body 58 so that the branch lines are opposite each other and disposed perpendicular to the fluid flow through supply line 12. As such, the flow passageway comprising the single supply line 12 and the branch lines 52,54 is generally T-shaped. Each of the branch lines has a substantially similar cross-sectional flow area.

Fluid flow devices 10,50 are adjusted in the following manner. After an appropriate valve is opened, water flows through the internal passageway of each device, first entering the single supply line 12 and then discharging from the ports 16,18. As the fluid travels through the branch lines 24,26 of device 10 or lines 54,56 of device 50, it ultimately exits the device via the openings in the spray nozzle face plate 30. If the fluid streams leaving each spray head assembly 28 do not converge equally in the center of the device, appropriate adjustment is made by rotating the volumetric control and balancing element 20 to thereby reposition the beveled end face 22 relative to the internal flow passageway through the device. Such rotation is accomplished by simply inserting an appropriate Allen wrench into the socket 44 of element 20 and slowly turning the wrench to the right or left until the streams do in fact converge equally in the center of the device.

FIG. 8 illustrates a neutral position of the beveled end face 22 which equally directs the fluid to both discharge ports. In those instances where there is no inherent imbalance, element 20 is simply located at its neutral position. Slight rotation of the element in a clockwise direction from its neutral position favors discharge port 16 and slightly more fluid is directed to that port. Such a position is shown in FIG. 9 where the element has been rotated 45° in a clockwise direction. The position shown in FIG. 10 totally favors the discharge port 16 and such position is accomplished by rotating element 20 90° in a clockwise direction from the position of FIG. 8.

Essentially the volumetric control and balancing element 20 is rotated until there is proper convergence of the water streams at the center of the device. As the beveled end face 22 is turned toward the right, more fluid flows through the right discharge port 16 then the left discharge port 18, and vice versa. An infinite amount of adjustment to the direction of flow is easily obtained by rotating element 20 360° about its longitudinal axis of rotation.

Equally important is adjustment of the volume of fluid flowing through the device by moving element 20 toward and away from supply line 12. If the streams of fluid emerging from the spray head assembly appear to be too strong, element 20 may be rotated in a clockwise direction until the water flow decreases. Clockwise rotation positions the beveled face 22 closer to supply line 12 thereby decreasing the flow through the device. Alternatively, if the streams appear too weak, element 20 is rotated in a counterclockwise direction until the flow increases. Such rotation moves the beveled end face 22 away from supply line 12 thereby allowing more fluid to flow through the device.

In actual use the volume of flow is initially corrected and that flow is then balanced so that the discharge ports 16,18 receive equal amounts whereby the streams emerging from spray head assembly 28 equally converge in the center of the device. The threaded connection between element 20 and conduit 14 may be designed to prevent inadvertent rotation of element 20. Also, in device 50 locking nut 52 prevents such accidental movement of element 20.

While the fluid flow devices specifically described herein relate to eye-face wash constructions, the adjustable volumetric control and balancing element 20 may be used in any fluid flow device where adjustments of this type are needed.

What is claimed:

1. In a fluid flow device having an internal flow passageway including a single supply line connected to two discharge ports, the improvement according to which an adjustable volumetric control and balancing element is positioned in the flow passageway at the juncture of the supply line and the two discharge ports, a rotatable connection between the volumetric control and balancing element and the fluid flow device enabling the element to rotate about an axis of rotation, the element including a beveled end face in the flow passageway inclined with respect to the axis of rotation of the element and the flow from the supply line for selectively directing fluid from the supply line to the discharge ports, and means for rotating the element to thereby change the position of the beveled end face relative to the discharge ports whereby fluid from the supply line impinges upon the beveled end face and is selectively directed to the discharge ports to thereby control and balance the flow of fluid directed to the discharge ports.

2. The combination of claim 1 wherein the beveled end face is planar.

3. The combination of claim 2 wherein the end face of the volumetric control and balancing element is beveled at an angle of approximately 20° from a perpendicular to the flow through the supply line.

4. The combination of claim 1 wherein the rotatable connection between the volumetric control and balancing element and the fluid flow device includes cooperating machine threads on the volumetric control and balancing element and the fluid flow device.

5. The combination of claim 4 including a locking nut threaded onto the volumetric control and balancing element and bearing against the fluid flow device for locking the element in place relative to the device.

6. The combination of claim 4 wherein the volumetric control and balancing element has a generally cylindrical body with machine threads on the outside thereof, and a wrench socket in the outside end of the element opposite the bevel.

7. The combination of claim 6 wherein the means for rotating the element to thereby change the position of the beveled end face relative to the discharge ports comprises a wrench arranged to matingly engage the socket in the volumetric control and balancing element.

8. The combination of claim 2 including a branch line connected to each discharge port, and wherein the flow passageway comprising the single supply and branch lines is T-shaped.

9. The combination of claim 8 wherein each of the branch lines has a substantially similar cross-sectional flow area.

10. The combination of claim 2 including a branch line connected to each discharge port, and wherein the flow passageway comprising the single supply and branch lines is Y-shaped.

11. The combination of claim 10 wherein each of the branch lines has a substantially similar cross-sectional flow area.

* * * * *